UNITED STATES PATENT OFFICE.

PAUL BEHRENS, OF TACOMA, WASHINGTON.

FLYING-MACHINE.

1,042,311.

Specification of Letters Patent.   Patented Oct. 22, 1912.

Application filed April 24, 1912. Serial No. 692,959.

*To all whom it may concern:*

Be it known that I, PAUL BEHRENS, a subject of the German Emperor, and residing at Tacoma, in the county of Pierce and State of Washington, have invented a new and useful Improvement in Flying-Machines, of which the following is a specification.

My invention relates to aeroplane or flying machines heavier than air and particularly to flying machines provided with a pair of propelling means adapted to rotate in opposite directions so as to offset gyroscopic effects.

An object of the invention is to provide a flying machine of the class described, which may be steered in lateral or vertical direction without employment of separate steering devices.

Another object of the invention is to dispose said pairs of propelling means with respect to a surface of the machine so as to direct currents of air against certain parts of said surface for the purpose of steering the vehicle laterally by the impact of the air against certain portions of the surface.

Another object of the invention is to dispose said propelling means on a support which is rotatably mounted with respect to the framework of the machine and to provide means for actuating said support during the flight of the machine.

Another object of the invention is to provide said propelling means in combination with a curved surface for the purpose of increasing the steering effect by the impact of the current of air against a portion of the surface which is inclined with respect to the direction of said current.

Another object of the invention is to dispense with the so-called elevator planes ordinarily comprising a plane or a plurality of planes which are adjustable so as to produce an ascending or descending movement of the ship. In the present invention this ascending or descending movement of the vehicle is caused by displacement of the center of gravity of the entire vehicle.

Another object of the invention, therefore, is to provide means for shifting the compartment or basket for the passenger with respect to the frame of the vehicle, causing thereby a variation of the angular position of the surface with respect to the direction of flight.

With these and other objects in view, I have illustrated an embodiment of the invention in the accompanying drawing, and other features and advantages of the invention will be specifically pointed out in the following specification and in the appended claims.

Figure 1:
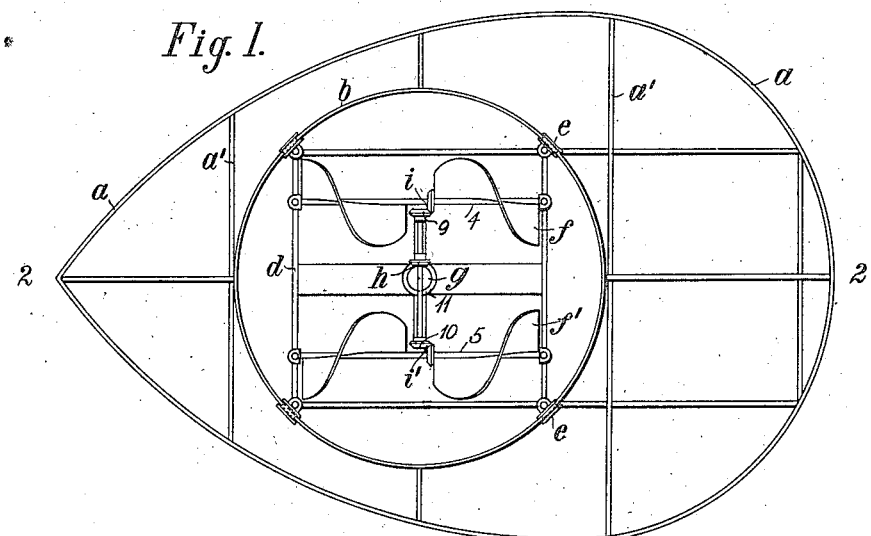
Figure 2:
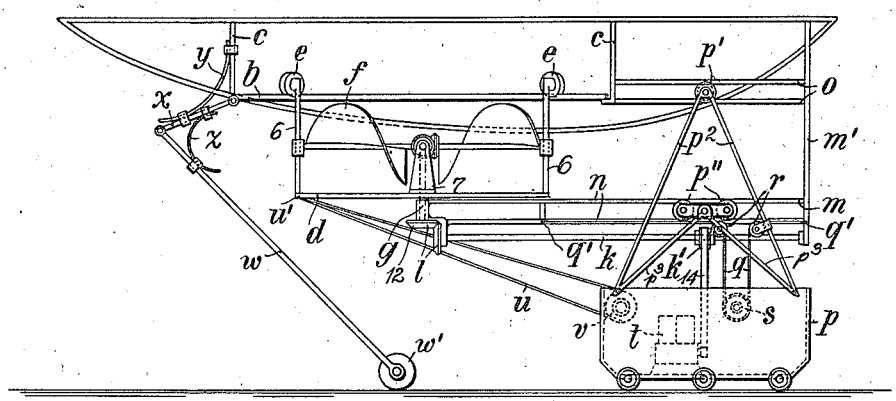

In the drawings:—Figure 1 shows the vehicle in top plan view, the surface being removed so as to clearly show the propelling means and support therefor, the basket for the passenger also being removed. Fig. 2 is a vertical longitudinal sectional view of Fig. 1, with parts in elevation, and Fig. 3 is a front elevation of the vehicle.

Figure 3:
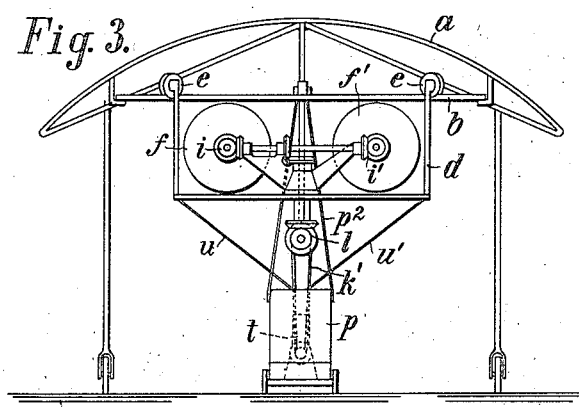

The surface $a$ preferably is curved in the shape of a flat inverted dish or such like, the concave surface being directed downward as may be clearly seen from Fig. 3. This surface $a$ is supported by a frame $a'$ having a plurality of longitudinal and transverse members over which the fabric of the plane $a$ is stretched. The propelling means of the vehicle comprise a pair of screw propellers $f$, $f'$ which rotate in opposite directions and which are mounted on shafts 4 and 5. The shafts for these propellers are supported in some suitable way on a platform $d$. This platform of skeleton structure, is suspended from a circular rail $b$ which is connected with the frame $a'$ of the surface $a$ by means of rods 6, as shown in Fig. 2. Rods 6 lead from the support $d$, so that said platform may be rotated about its center.

A bearing bracket 7 on the platform supports a shaft $g$, the ends of which are provided with bevel gears 9 and 10 respectively, in engagement with bevel gears $i$ and $i'$ mounted on the propeller shafts 4 and 5. The shaft 7 also has a bevel gear $h$ near the center portion thereof in engagement with a bevel gear 11 mounted at the upper end of the shaft $g$. A rotary movement is imparted to the last named shaft by means of a shaft $k$ longitudinally supported in the frame $m$ which is connected to the frame $a'$ by means of braces $m'$. The front end of the shaft $k$ carries a bevel gear 1 meshing with a bevel gear 12 at the lower portion of the shaft $g$, said last named shaft projecting below the platform or turntable $d$.

The additional frame $m$ has a plurality of parallel bars $n$ and $o$. These bars serve as guiding means for a roller $p'$ and a truck $p''$ which are connected by means of the rods $p^2$ and $p^3$, respectively, with the basket $p$ adapted to form the compartment for the passenger. By means of this roller $p'$ and truck $p''$, the basket may be displaced longitudinally with respect to the surface $a$, and as this basket also contains the motor $t$ it is obvious that the center of gravity of the entire ship may be shifted by shifting the basket. The weight of the entire ship, including the basket $p$, and motor $t$, is balanced so that the ship will remain in a horizontal plane when the basket is in the normal position indicated in Fig. 2.

The basket may be displaced longitudinally with respect to the surface $a$ by means of a rope $q$, the two ends of which are secured at $q'$ in the skeleton frame $m$ of the machine. This rope or cable $q'$ is guided over the sheaves $r$ which are secured to rods $p^2$ and $p^3$, respectively, the portion of the rope intermediate said sheaves being also guided over a disk $s$ in the basket. When said last named disk is rotated, the basket will be advanced or returned in accordance with the direction of the rotation. The driving shaft $k$ has a pulley $k'$ which is slidably secured to the shaft, but which is also mounted thereon so as to rotate with the same. This support may, for instance, be accomplished by means of a key in the hub of the pulley slidable in a long keyway on the shaft. Whenever the basket $p$ is displaced longitudinally the pulley $k'$, which is connected with the motor $t$ by a belt 14, will take part in the displacement and also be moved longitudinally on the shaft $k$. It is obvious that the rotation of the motor shaft will be transmitted to the propelling means by the belt 14, pulley $k'$, gears 1 and 12, shaft $g$ and gears 11, $h$, $i$, and $i'$.

For the purpose of rotating the turntable $d$ a rope $u$ is secured thereon at the point $u'$, this rope being guided over a roller $v$ which is disposed in the basket $p$. When the roller is rotated one end of the rope will be retracted while the other end advances, an arrangement which may be similar to the rope connection of steering rudders on ships.

On account of the rotation of the support $d$ the propellers $f$, $f'$ assume a position in an angle to the longitudinal axis of the surface $a$ remaining however underneath said surface in every position the turntable may assume. The air which is thrown backwardly by the action of said propellers impacts against a lateral portion of the surface and acts as a steering means rendering the attachment of a special rudder for this purpose superfluous.

For the purpose of supporting the machine on the ground, and to insure a safe landing of the machine, a plurality of rods $w$ provided with running wheels $w'$ are pivotally connected to a link $x$, these links being in pivotal connection with the frame $a'$ of the machine. Between the suspension rods $c$ and the pivotal links $x$, springs $y$ are interposed which have a tendency to press the links downward. The running wheels $w$ are maintained in engagement with the ground by means of another spring $z$ which is interposed between the links $x$ and the rod $w$, as may be clearly seen from Fig. 2.

It will be seen that the supporting surface $a$, which is longitudinally channeled, forms a combined supporting and steering surface when associated with a propelling means shiftably disposed, in the manner set forth. All movable air acting surfaces are dispensed with and the supporting surface is rigidly mounted on the frame. It will thus be seen that merely by manipulating the propelling means, the aeroplane can be steered laterally, and by changing the center of mass, as by shifting the car, a change of altitude may be obtained.

I claim:

1. An aeroplane comprising in combination, a frame, a supporting surface thereon, bodily shiftable propelling means on said frame, a car shiftable on said frame, means for shifting the position of the car to change the center of mass or tilt the aeroplane, means on the car for bodily shifting the propelling means, a prime mover carried by the car for driving said propelling means, and means maintaining driving connection between said prime mover and propelling means irrespective of the position of the car with respect to said frame, substantially as described.

2. An aeroplane devoid of movable steering vanes comprising in combination, a frame, a combined supporting and steering surface rigidly secured to said frame and of longitudinally channeled formation and having open front and rear ends to afford a free passage of air therethrough on lines parallel with the longitudinal axis of said surface, propelling means bodily shiftable on said frame about a vertical axis intersecting the longitudinal axis of said channeled surface passage, and located entirely within the longitudinal and lateral edges of the channeled passage and between the ends of said passage and disposed at such an elevation within said channeled passage that the stream of wake will pass freely through the open rear end of said passage when said means is in a normal position and impinge against either side of the channeled passage when shifted from a normal position, and mechanism for shifting the said propelling means to a normal position to propel the aeroplane and from a normal position to direct the stream of wake against a side of said surface to steer the aeroplane laterally during propulsion, substantially as described.

In testimony whereof I affix my signature in presence of two witnesses.

PAUL BEHRENS.

Witnesses:
C. W. FROMHOLD,
J. S. EKRE.